United States Patent
Yao

(10) Patent No.: US 9,886,926 B2
(45) Date of Patent: Feb. 6, 2018

(54) ARRAY SUBSTRATE, LIQUID CRYSTAL DISPLAY PANEL AND METHOD FOR DRIVING THE SAME

(71) Applicant: Shenzhen China Star Optoelectronics Technology Co., Ltd., Shenzhen, Guangdong (CN)

(72) Inventor: Xiaohui Yao, Guangdong (CN)

(73) Assignee: Shenzhen China Star Optoelectronics Technology Co., Ltd., Shenzhen, Guangdong (CN)

( * ) Notice: Subject to any disclaimer, the term of this patent is extended or adjusted under 35 U.S.C. 154(b) by 60 days.

(21) Appl. No.: 14/417,646

(22) PCT Filed: Jan. 20, 2015

(86) PCT No.: PCT/CN2015/071138
§ 371 (c)(1),
(2) Date: Mar. 21, 2016

(87) PCT Pub. No.: WO2016/078213
PCT Pub. Date: May 26, 2016

(65) Prior Publication Data
US 2016/0335971 A1  Nov. 17, 2016

(30) Foreign Application Priority Data
Nov. 17, 2014 (CN) .......................... 2014 1 0655348

(51) Int. Cl.
*G09G 3/26* (2006.01)
*G09G 3/36* (2006.01)
(Continued)

(52) U.S. Cl.
CPC ......... *G09G 3/3677* (2013.01); *G02F 1/1362* (2013.01); *G02F 1/1368* (2013.01);
(Continued)

(58) Field of Classification Search
None
See application file for complete search history.

(56) References Cited

U.S. PATENT DOCUMENTS

2013/0229326 A1   9/2013 Kamada

FOREIGN PATENT DOCUMENTS

| CN | 203350570 U | 12/2013 |
| CN | 103676253 A | 3/2014 |

(Continued)

OTHER PUBLICATIONS

International Search Report and Written Opinion, China, dated Jan. 20, 2015.

*Primary Examiner* — Kenneth B Lee, Jr.
(74) *Attorney, Agent, or Firm* — Kim Winston LLP

(57) ABSTRACT

Related to is an array substrate, a liquid crystal display panel, and a driving method for the liquid crystal display panel. The array substrate includes a plurality of pixel units, each of which includes a main-area electrode, a sub-area electrode and a sharing capacitor, wherein a control terminal of a sharing control switch which connects the sharing capacitor with the sub-area electrode is connected, via a control switch, to a scan line correlated with an $N^{th}$ pixel unit which is arranged in a scanning direction and counted from the present pixel unit. The control switch is configured to be turned on in a two-dimensional scanning mode when at least there is a scan signal on the scan line, and to be turned off in a three-dimensional scan mode when at least there is the scan signal on the scan line.

16 Claims, 5 Drawing Sheets

(51) Int. Cl.
*G02F 1/1362* (2006.01)
*G02F 1/1343* (2006.01)
*G02F 1/1368* (2006.01)
*G09G 3/00* (2006.01)
*H04N 13/04* (2006.01)

(52) U.S. Cl.
CPC .. *G02F 1/134309* (2013.01); *G02F 1/136286* (2013.01); *G09G 3/003* (2013.01); *G09G 3/3648* (2013.01); *G09G 3/3659* (2013.01); *G09G 3/3688* (2013.01); *H04N 13/0438* (2013.01); *H04N 13/0497* (2013.01); *G09G 2300/0426* (2013.01); *G09G 2300/0447* (2013.01); *G09G 2300/0814* (2013.01); *G09G 2300/0819* (2013.01); *G09G 2300/0842* (2013.01); *G09G 2310/0251* (2013.01); *G09G 2310/08* (2013.01); *G09G 2320/0204* (2013.01); *G09G 2320/0233* (2013.01); *G09G 2320/0242* (2013.01); *G09G 2320/0247* (2013.01)

(56) References Cited

FOREIGN PATENT DOCUMENTS

| | | |
|---|---|---|
| CN | 103728752 A | 4/2014 |
| CN | 103941442 A | 7/2014 |

$(N-1)*T$

| Time Axis | 1st frame | 2nd frame | 3rd frame | 4th frame | 5th frame | 6th frame | 7th frame | 8th frame | 9th frame | ... |
|---|---|---|---|---|---|---|---|---|---|---|
| Input Signal | ☐ | ■ | ☐ | ■ | ☐ | ■ | ☐ | ■ | ☐ | ... |
|  | L255 | L0 | L255 | L0 | L255 | L0 | L255 | L0 | L255 | ... |
| L/R | L | R | L | R | L | R | L | R | L | ... |
| Polarity | + | − | + | − | + | − | + | − | + | ... |
| Voltage | 7V | 1V | 7V | 1V | 7V | 1V | 7V | 1V | 7V | ... |
| Voltage Difference | 1V | 5V | 1V | 5V | 1V | 5V | 1V | 5V | 1V | ... |

Table I

| Time Axis | 1st frame | 2nd frame | 3rd frame | 4th frame | 5th frame | 6th frame | 7th frame | 8th frame | 9th frame | ... |
|---|---|---|---|---|---|---|---|---|---|---|
| Input Signal | L255 | L0 | L255 | L0 | L255 | L0 | L255 | L0 | L255 | ... |
| L/R | L | R | L | R | L | R | L | R | L | ... |
| Polarity | + | + | − | − | + | + | − | − | + | ... |
| Voltage | 7V | 1V | 5V | 11V | 7V | 1V | 5V | 11V | 7V | ... |
| Voltage Difference | 1V | −5V | −1V | 5V | 1V | −5V | −1V | 5V | 1V | ... |

Table II

Fig. 5

| Time Axis | 1st frame | 2nd frame | 3rd frame | 4th frame | 5th frame | 6th frame | 7th frame | 8th frame | 9th frame | ... |
|---|---|---|---|---|---|---|---|---|---|---|
| Input Signal | L255 | L255 | L255 | L255 | L255 | L255 | L255 | L255 | L255 | ... |
| L/R | L | R | L | R | L | R | L | R | L | ... |
| Polarity | + | + | − | − | + | + | − | − | + | ... |
| Luminance | Dark | light | Dark | light | Dark | light | Dark | light | Dark | light |

Table III

Fig. 6

ARRAY SUBSTRATE, LIQUID CRYSTAL DISPLAY PANEL AND METHOD FOR DRIVING THE SAME

CROSS-REFERENCE TO RELATED APPLICATIONS

The present disclosure claims benefit of Chinese patent application CN 201410655348.4, filed on Nov. 17, 2014, and entitled "ARRAY SUBSTRATE, LIQUID CRYSTAL DISPLAY PANEL AND METHOD FOR DRIVING THE SAME," the entire disclosure of which is hereby incorporated by reference.

FIELD OF THE INVENTION

The present disclosure relates to liquid crystal display technology, and particularly to an array substrate and a liquid crystal display panel that are capable of eliminating the luminance difference between the left and right eyes as well as a method for driving the liquid crystal display.

BACKGROUND OF THE INVENTION

Compared to the conventional two-dimensional plane display technology, the three-dimensional imaging technology provides more vivid three-dimensional images, and therefore has become the mainstream of development in display technology. So far, liquid crystal display devices (LCDs) have become majority configurations for various industries and even home entertainment displays because of such advantages thereof as light and handy appearances, low power consumption, radiation-free attribute. Accordingly, three-dimensional imaging LCDs which are developed based on the original two-dimensional display technology have become a new hot spot to be developed.

The common three-dimensional imaging technology is currently shutter glasses technology. This technology uses a time-division effect, so that left-eye and right-eye lenses of three-dimensional glasses are alternatively switched on in turn. When the right-eye lens is on, the liquid crystal display device outputs an image to be supplied to the right-eye; and when the left-eye lens is on, the LCD outputs an image to be supplied to the left eye. Then, an image viewer, based on the angle difference between viewing angles of the left and right eyes, may synthesize the left-eye and right-eye images in his/her brain to produce a three-dimensional image with depth of field and hierarchical perception.

In the liquid crystal display device, the liquid crystal molecules are generally driven to rotate by alternating current, and the rotation angle of the liquid crystal molecules is changed to enable image display of different gray scales. The reason for such a driving manner is that in case direct current were used to rotate the liquid crystal molecules, mobile ions inside the liquid crystal molecules would move in the same direction, so that an electric field would be generated and thus interfere the rotating direction of the liquid crystal molecules. That is, residual direct current would appear. Typically, to avoid the quality of image display being affected by residual direct current, a voltage exerted on a pixel electrode of a pixel unit is changed periodically in the liquid crystal display through switch between the positive polarity and the negative polarity of a data signal of image information. However, for the three-dimensional liquid display crystal panel which co-works with the shutter glasses, if a polarity reversion driving method in terms of single-frame is used to switch between the negative polarity and the positive polarity of the data signal of image information, then residual charge would appear which is similar to the residual direct current, causing a three-dimensional image sticking (IS).

It is assumed that there is a liquid crystal display device of 256 gray scales, in which a bright screen pervious to light (a white picture with 255 gray scales) is marked as L255, while an opaque, dark screen (a black screen with 0 gray scales) is denoted as L0. Positive and negative driving voltages for the white screen are 7 V and 5 V respectively, and for the black screen, the positive and negative driving voltages are 1 V and 11 V respectively. A common electrode voltage is 6 V. Then, with respect to a certain pixel electrode in the panel, Table I, as shown in FIG. 4, shows changes of a voltage exerted on the pixel electrode and its voltage difference from the common electrode.

It can be seen from Table I, as shown in FIG. 4, that, in this case, the difference of voltages of the pixel electrode relative to the voltage of the common electrode switches over 1 V and 5 V. That is, a voltage acting on the liquid crystal during a positive polarity driving period is 1 V; and a voltage exerted thereon during a negative polarity driving period is 5 V. As the voltages exerted on the liquid crystal during the positive and negative polarity driving periods differ considerably and both present as positive, they cannot cancel each other out, such that the residual charge which is similar to the residual direct current would occur after a long time operation. This leads to a three-dimensional image sticking.

To avoid a three-dimensional image sticking, in the prior art, a polarity reversion driving method in terms of double-frame is used for switching between positive polarity and negative polarity of the data signal of image information. In this driving method, since the polarity of the data signal is switched over every two frames, the voltage of the pixel electrode and its difference from the common electrode respectively vary as shown in Table II, as shown in FIG. 5.

According to Table 11 in FIG. 5, the voltage difference of the pixel electrode relative to the common electrode, under this situation, repeatedly switches in the cycle of 1 V→−5 V→−1 V→5 V. That is, during the positive polarity driving period, voltages applied to the liquid crystal are 1 V and −5 V; and during the negative polarity voltage driving period, the voltages are −1 V and 5 V. The voltage difference of the pixel electrode relative to the common electrode during the positive polarity driving period may counteract that of the pixel electrode relative to the common electrode during the negative polarity driving period, so that the image sticking is eliminated. However, this further brings about uneven luminance between the left and right eyes. Such a problem is more conspicuous especially for the liquid crystal display panel which uses charge-sharing technique (LCS) to eliminate the color shift. The reason for the uneven luminance is that, in the liquid crystal display panel, in order to eliminate the color shift due to a large viewing angle, the pixel electrode of the pixel unit is typically divided into two portions, i.e. a main area (Main) and a sub area (Sub), and provided with a sharing capacitor, such that the charge at the main and sub areas is re-distributed, under the control of a control signal, to change the voltages of the main and sub areas. Since the charge sharing capacitor has a capability of charge storage, on the one hand, a new frame of image could be brighter, due to the charge accumulation effect, when the charge obtained by the sharing capacitor during the new frame of image may have the same polarity as the charge stored during the previous frame. On the other hand, when the charge obtained by the sharing capacitor during the new frame of image presents opposite polarity against the charge stored in the previous frame, the new frame of image could be darker because of charge counteraction. Therefore, under the same input data signal (e.g., an input signal L255 as shown in Table III, as shown in FIG. 6), the luminance of an image for the left-eye is always weaker than the luminance of an image for the right-eye when output by the liquid crystal display panel is based on the polarity reversion driving method in terms of double-frame.

In response to these problems mentioned above, provided by the present disclosure is, through repeated experiments and research, an array substrate and a liquid crystal display panel that are capable of eliminating the luminance difference between the left and right eyes, and a method for driving the liquid crystal display.

SUMMARY OF THE INVENTION

For these technical problems described above, the objective of the present disclosure is to provide a new array substrate and a liquid crystal display panel, and a method for driving the liquid crystal display panel. The array substrate and the liquid crystal display panel are not only able to overcome, under a two-dimensional scanning mode, the color shift due to a large viewing angle, but also to eliminate the luminance difference between the left and right eyes under a three-dimensional scanning mode.

Provided in the present disclosure is an array substrate, comprising:

a plurality of scan lines and a plurality of data lines; and
a plurality of pixel units arranged in an array formed by the plurality of scan lines and the plurality of data lines in a staggered manner, wherein each of the pixel units correlates with one of the scan lines and one of the data lines, and comprises:

a main-area electrode connected to a related data line via a main-area control switch, a control terminal of which switch is connected to a related scan line, such that the main-area electrode has, when there is a scan signal on the scan line, a main-area voltage by receiving a data signal from the data line;

a sub-area electrode connected to a related data line via a sub-area control switch, a control terminal of which switch is connected to a related scan line, such that the sub-area electrode has, when there is the scan signal on the scan line, a sub-area voltage by receiving the data signal from the data line; and a sharing capacitor connected to the sub-area electrode via a sharing control switch, wherein a control terminal of the sharing control switch is connected, via a control switch, to a scan line correlated with an $N^{th}$ pixel unit which is arranged in a scanning direction and counted from the present pixel unit, wherein said control switch is configured, according to a received control signal, to be turned on under a two-dimensional scanning mode when at least there is the scan signal on the scan line to which the control switch is connected such that a charge sharing effect is enabled, and to be turned off under a three-dimensional scanning mode when at least the scan signal is on the scan line to which the control switch is connected such that the charge sharing effect is disabled.

According to an embodiment of the present disclosure, in the scanning direction, the control switches correlated with the pixel units in terms of every N−1 scan lines are configured as one set, wherein the control terminals of odd-numbered sets of control switches are connected to a first switch-control line to receive a first switch-control signal, under the action of which the control switches are turned on or turned off, and the control terminals of even-numbered sets of control switches are connected to a second switch-control line to receive a second switch-control signal, under the action of which the control switches are all turned on or turned off, wherein under the two-dimensional scanning mode, both the first switch-control signal and the second switch-control signal are continuous, high-level signals; and under the three-dimensional scanning mode, the first switch-control signal and the second switch-control signal are signals which are synchronized with one another but with inverse phases, i.e., a pulse train in terms of odd sequence and a pulse train in terms of even sequence respectively, a pulse width of which is equal to (N−1) times the duration of the scan signal.

According to another embodiment of the present disclosure, the control terminals of the control switches correlated with the pixel units to which the odd-numbered scan lines are related are connected in parallel to the first switch-control line to receive the first switch-control signal, under the action of which the control switches are thus turned on or turned off. The control terminals of the control switches correlated with the pixel units to which the even-numbered scan lines are related are connected in parallel to the second switch-control line to receive the second switch-control signal, under the action of which the control switches are thus turned on or off, wherein under the two-dimensional scanning mode, both the first switch-control signal and the second switch-control signal are continuous, high-level signals; and under the three-dimensional scanning mode, the first switch-control signal and the second switch-control signal are signals of pulse sequence which are synchronized with one another but with inverse phases, a pulse width of which is equal to the time length of the scan signal, and meanwhile, if N is an odd number, then the first switch-control signal is a pulse train in terms of even sequence, and if N is an even, the first switch-control signal is a pulse train in terms of odd sequence.

According to an embodiment of the present disclosure, the array substrate is further provided with auxiliary lines with each matching one of the scan lines, by means of an auxiliary line the control terminal of the sharing control switch in each of the pixel units being connected to its related control switch.

According to an embodiment of the present disclosure, the control switch may be arranged at a fan-out area.

According to an embodiment of the present disclosure, the main-area control switch, the sub-area control switch, the sharing control switch and the control switch each are thin film transistors.

In addition, the present disclosure further provides a liquid crystal display panel, comprising:

the array substrate described above, a color filter substrate, and a liquid crystal layer between the array substrate and the color filter substrate.

In addition, the present disclosure also provides a method for driving the above liquid crystal display panel, including steps for driving two-dimensional scanning and steps for driving three-dimensional scanning, wherein the steps for driving the two-dimensional scanning comprise:

sequentially inputting, in a scanning direction, a scan signal to each scan line;

turning on, when the scan line has a scan signal, a main-area control switch and a sub-area control switch in a pixel unit to which the scan line is related, so that a main-area electrode and a sub-area electrode have an identical voltage under the action of a data signal on a data line; and turning on, at the same time, a control switch connected to the scan line to turn on a sharing control switch connected to the control switch, so that a charge-sharing effect is enabled in the pixel unit where the sharing control switch is located; and the steps for driving the three-dimensional scanning comprise:

sequentially inputting, in a scanning direction, a scan signal to each scan line;

turning on, when the scan line has a scan signal, the main-area control switch and the sub-area control switch in the pixel unit to which the scan line is related, so that the main-area electrode and the sub-area electrode have an identical voltage under the action of a data signal on a data line; and turning off, at the same time, the control switch connected to the scan line.

According to one embodiment of the present disclosure, in the scanning direction, the control switches correlated with the pixel units in terms of every N−1 scan lines are configured as one set, and the control switches of odd-numbered sets are applied with the first switch-control signal and the control switches of even-numbered sets are applied with the second switch-control signal, wherein under the two-dimensional scanning mode, both the first switch-control signal and the second switch-control signal are continuous, high-level signals; and under the three-dimensional scanning mode, the first switch-control signal and the second switch-control signal are signals which are synchronized with one another but with inverse phases, i.e., a pulse train in terms of odd sequence and a pulse train in terms of even sequence respectively, a pulse width of which is equal to (N−1) times the time length of the scan signal.

According to a further embodiment of the present disclosure, the control terminals of the control switches correlated with the pixel units to which the odd-numbered scan lines are related are applied with the first switch-control signal, and the control terminals of the control switches correlated with the pixel units to which the even-numbered scan lines are related are applied with the second switch-control signal, wherein under the two-dimensional scanning mode, both the first switch-control signal and the second switch-control signal are continuous, high-level signals; and under the three-dimensional scanning mode, the first switch-control signal and the second switch-control signal are signals of pulse sequence which are synchronized with one another but with inverse phases, a pulse width of which is equal to the time length of the scan signal, and meanwhile, if N is an odd number, then the first switch-control signal is a pulse train in terms of even sequence, and if N is an even number, the first switch-control signal is a pulse train in terms of odd sequence.

Other features and advantages of the present disclosure will be set forth in the following explanation, and part of these will be more apparent from the specifications, or may be understood by implementing the disclosure.

BRIEF DESCRIPTION OF THE DRAWINGS

FIG. 5 is Table II and shows the voltage of the pixel electrode and its difference from the common electrode; and FIG. 6 is Table III and shows the condition under an input signal L255.

DETAILED DESCRIPTION OF THE EMBODIMENTS

To achieve the above objective, the present disclosure provides a new array substrate, and a liquid crystal display panel and a driving method for the liquid crystal display, wherein the array substrate comprises:

a plurality of scan lines and a plurality of data lines; and a plurality of pixel units arranged in an array formed by the plurality of scan lines and the plurality of data lines in a staggered manner, wherein each of the pixel units correlates with a scan line and a data line and comprises:

a main-area electrode connected to a related data line via a main-area control switch, a control terminal of which switch is connected to a related scan line, such that the main-area electrode may have, when there is a scan signal on the scan line, a main-area voltage by receiving a data signal from the data line;

a sub-area electrode connected to a related data line via a sub-area control switch, a control terminal of which switch is connected to a related scan line, such that the sub-area electrode may have, when there is said scan signal on the scan line, a sub-area voltage by receiving the data signal from the data line; and a sharing capacitor connected to the sub-area electrode via a sharing control switch, wherein a control terminal of the sharing control switch is connected, via a control switch, to a scan line correlated with an $N^{th}$ pixel unit which is arranged in a scanning direction and counted from the present pixel unit, wherein the control switch is configured, according to a received control signal, to be turned on under a two-dimensional scanning mode when at least there is a scan signal on the scan line to which the control switch is connected such that charge sharing effect is enabled, and to be turned off under a three-dimensional scanning mode when at least a scan signal is on the scan line to which the control switch is connected such that charge sharing effect is disabled.

To make the objective and technical solution of the present disclosure as well as the technical effect to be achieved more clearly, the present disclosure will be further described in detail in conjunction with the specific embodiments and drawings below.

Embodiment I

Figure 1:
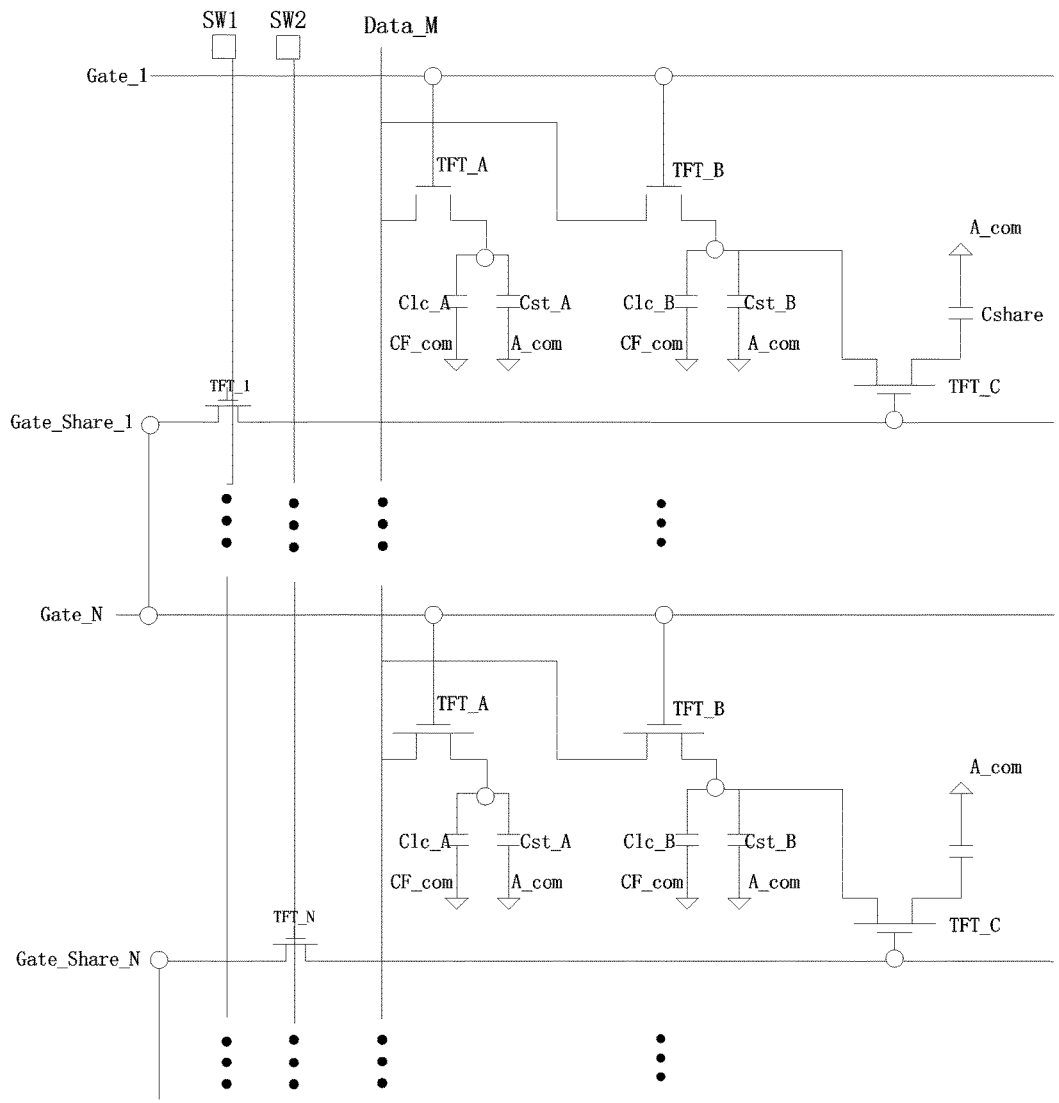
FIG. 1 is a partial equivalent circuit diagram of an array substrate according to the present disclosure.

FIG. 1 is a partial equivalent circuit diagram of the array substrate provided according to the present disclosure. The array substrate includes an image display area AA and a fan-out area (not shown). In this case, the image display area AA includes a plurality of common electrodes, a plurality of scan lines, a plurality of data lines, and a plurality of pixel units arranged in a pixel array formed by the plurality of scan lines and the plurality of data lines in a staggered manner. Each of the pixel units has the same structure which corresponds to one scan line and one data line, and comprises a main-area electrode (Main), a sub-area electrode (Sub) and a charge sharing capacitor Cshare for sharing of charge. An example is taken below from a pixel unit $P_{1M}$ which is related to a first scan line Gate_1 and an $M^{th}$ data line Data_M, such that the structure of the pixel unit in the array substrate according to the present disclosure may be described in detail.

The main-area electrode (Main) is provided with a main-area control switch TFT_A. The main-area control switch TFT_A has a first terminal connected to the related data line Data_M, a second terminal connected to the main-area electrode, and a control terminal connected to the related scan line Gate_1. When the control terminal of the main-area control switch TFT_A receives a scan signal from a scan driving circuit via the scan line Gate_1, the first and second terminals of the main-area control switch TFT-A are turned on, so that a data signal of the data line Data_M generated from a data driving circuit is transmitted to the main-area electrode. At the same time, under the action of the data signal, a main-area liquid crystal capacitor Clc_A formed via coupling of the main-area electrode with a common electrode CF_com of a color filter substrate, and a main-area storage capacitor Cst_A formed via coupling of the main-area electrode with a common electrode A_com of the array substrate start to be charged, so that the main-area electrode may have and maintain a certain level of main-area voltage.

The sub-area electrode (Sub) is provided with a sub-area control switch TFT_B, which has a first terminal connected to the related data line Data_M, a second terminal connected to the sub-area electrode, and a control terminal connected to the related first scan line Gate_1. When the control terminal of the sub-area control switch TFT_B receives a scan signal from the scan driving circuit via the scan line Gate_1, the first and second terminals of the sub-area control switch TFT_B are both turned on, so that a data signal of the data line Data_M generated from the data driving circuit is transmitted to the sub-area electrode. Meanwhile, a sub-area liquid crystal capacitor Clc_B formed via coupling of the sub-area electrode with the common electrode CF_com of the color filter substrate, and a sub-area storage capacitor Cst_B formed via coupling of the sub-area electrode with the common electrode A_com of the array substrate start to be charged under the action of the data signal, so that the sub-area electrode may have and maintain a certain level of sub-area voltage.

The sharing capacitor Cshare is provided with a sharing control switch TFT_C. A first terminal of the sharing control switch TFT_C is connected to the sub-area electrode, and a second terminal thereof is connected to one end of the sharing capacitor Cshare, the other end of which is connected to the common electrode A_com of the array substrate. A control terminal of the sharing control switch TFT_C is connected, via a control switch TFT_1, to a scan line Gate_N which is related to the $N^{th}$ pixel unit counted from the present pixel unit in terms of the scanning direction.

It should be noted that, in the present embodiment, the number of control switches provided on the array substrate is identical with that of the scan lines, i.e., each control switch corresponds to one row of pixel units. In light of this, all of the control switches in this embodiment are preferably arranged at the fan-out area of the array substrate. In addition, for simple connection, auxiliary lines with each matching one scan line are preferably arranged on the array substrate. In particular, as shown in FIG. 1, the auxiliary lines Gate_Share_1, Gate_Share_2, Gate_Share_3 . . . with each matching one of the scan lines Gate_1, Gate_2, Gate_3 . . . are arranged on the array substrate in the scanning direction: in the pixel unit to which the first scan line Gate_1 is related, the control terminal of the sharing control switch is connected to a first auxiliary line Gate_Share_1, and the control switch TFT_1 is connected to the first auxiliary line Gate_Share_1 at its first terminal and to the $N^{th}$ scan line Gate_N at the second terminal. Meanwhile, in the pixel unit to which the second scan line Gate_2 is related, the control terminal of the sharing control switch is connected to a second auxiliary line Gate_Share_2, and a control switch TFT_2 is connected to the second auxiliary line Gate_Share_2 at its first end and to an $(N+1)^{th}$ scan line Gate_N+1 at its second end; and in the pixel unit to which the third scan line Gate_3 is related, the control terminal of the share control switch is connected to a third auxiliary line Gate_Share_3, and a control switch TFT_3 is connected to the third auxiliary line Gate_Share_3 at its first end and to an $(N+2)^{th}$ scan line Gate_N+2 at the second end . . . and so on. In practice, of course, there are various wiring arrangements which are not limited thereto.

The above-mentioned main-area control switch, the sub-area control switch, the sharing control switch and the control switch each may be a thin film transistor.

In order to retain the charge sharing effect under the two-dimensional scanning mode to overcome the color shift due to a large viewing angle, and to break off the charge sharing effect under the three-dimensional scanning mode to eliminate the luminance difference between the left and right eyes, provided by the present disclosure is that: under the two-dimensional scanning mode, each control switch is turned on when at least there is a scan signal on the scan line to which the control switch is connected; and under the three-dimensional scanning mode, each control switch is turned off when at least there is a scan signal on the scan line to which the control switch is connected.

In this regard, one embodiment is provided by the present disclosure. That is, in the scanning direction, the control switches correlated with the pixel units in terms of every N−1 scan lines are configured as one set. In this case, the control terminals of odd-numbered sets of control switches are connected to a first switch-control line to receive a first switch-control signal, under the action of which signal these control terminals are turned on or off. Moreover, the control terminals of even-numbered sets of control switches are connected to a second switch-control line to receive a second switch-control signal, under the action of which the control terminals are all turned on or off.

An example is taken below when N=3.

In the scanning direction, every two control switches are grouped into one set, wherein the control switches TFT_1 and TFT_2 are the first set, then the control switches TFT_3 and TFT_4 becoming the second one, and the control switches TFT_5 and TFT_6 the third set, and then the control switches TFT_7 and TFT_8 the fourth one . . . and so on. In this case, all the control terminals of the odd-numbered sets of control switches, i.e. the first set, the third set, the fifth set . . . are connected to a first switch-control line Line_1 to receive a first switch-control signal SW1; and all the control terminals of the even-numbered sets of control switches, i.e. the second set, the fourth set, the sixth set . . . are connected to a second switch-control line Line_2 to receive a second switch-control signal SW2.

Figure 2A:
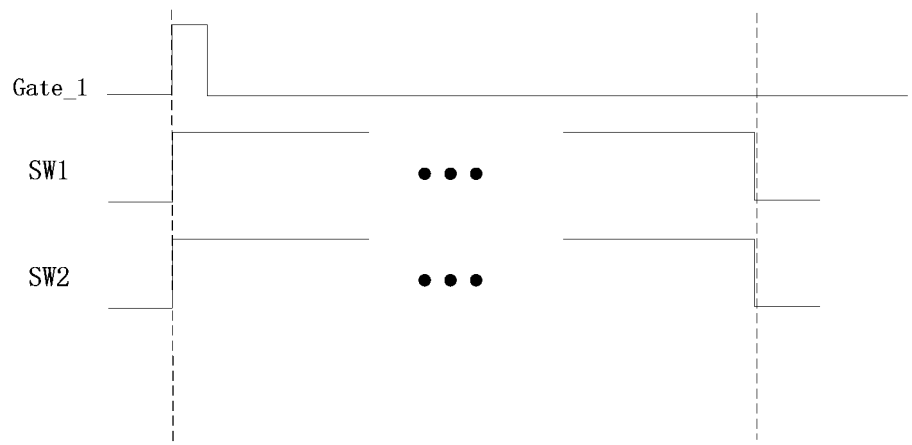
FIG. 2A is a diagram of a timing control signal under a two-dimensional scanning mode according to a first embodiment of the present disclosure.

As shown in FIG. 2A, in the two-dimensional scanning mode, both the first switch-control signal SW1 and the second switch-control signal SW2 are continuous, high-level signals, and thus all of the control switches are being kept on during a scanning period, which meets the aforementioned operating condition that "each control switch is turned on when at least there is a scan signal on the scan line to which the control switch is connected." That is, in the two-dimensional scanning mode, when there is a scan signal on a scan line, the main-area control switch and the sub-area control switch in the pixel unit to which the scan line is related are both turned on, so that the main-area and sub-area electrodes have an identical voltage under the action of the data signal of the data line. Meanwhile, since the control switch connected to this scan line is kept on, the scan signal of the scan line can also be transmitted to a control terminal of the sharing control switch in the correlated pixel unit, such that the charge sharing effect is enabled in the related pixel unit to eliminate the color shift.

Figure 2B:
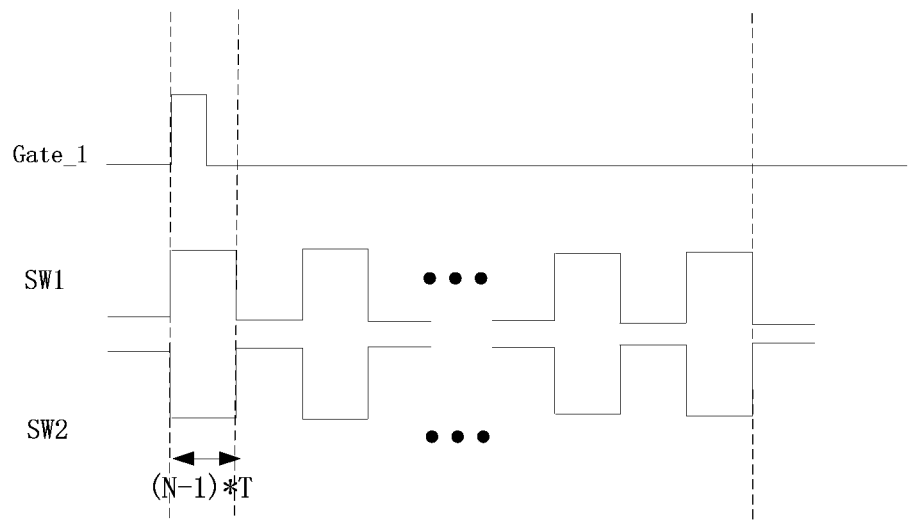
FIG. 2B a diagram of a timing control signal under a three-dimensional scanning mode according to the first embodiment of the present disclosure.

As shown in FIG. 2B, in the three-dimensional scanning mode, the first switch-control signal SW1 and the second switch-control signal SW2 are signals which are synchronized with one another but have inverse phases, i.e., a pulse train in terms of odd sequence and a pulse train in terms of even sequence respectively, and a pulse width of each signal is equal to (N−1) times the time length of the scan signal. In this embodiment, the pulse width is 2 T, wherein T is the time length of the scan signal. It can be seen from FIG. 2B, in the scanning direction, when a high-level scan signal is input to the third scan line Gate_3, the first control signal SW1 received at the control terminal of the control switch TFT_1 to which the third scan line Gate_3 is connected is shown at a low level, such that the control switch TFT_1 is turned off. When a high-level scan signal is input to the fourth scan line Gate_4, the first control signal SW1 received at the control terminal of the control switch TFT_2 to which the fourth scan line Gate_4 is connected is at a low level, such that the control switch TFT_2 is turned off. Then, when the fifth scan line Gate_5 is input with a high-level scan signal, the second control signal SW2 received at the control terminal of the control switch TFT_3 to which the fifth scan line Gate_5 is connected is at a low level, such that the control switch TFT_3 is turned off . . . and so forth. Based on such a timing control manner, whenever the scan signal is input to each of the scan lines, the control switch to which the scan line is connected may be turned off due to the low-level control signal (SW1 or SW2) received at the control terminal of the control switch, such that the aforementioned operating condition that "each control switch is turned off when at least there is a scan signal on the scan line to which the control switch is connected" is fulfilled. Therefore, in the three-dimensional scanning mode, when there is a scan signal on the scan line, only the main-area and sub-area control switches in the pixel unit to which the scan line is correlated are turned on, so that the main-area electrode and the sub-area electrode have the identical voltage under the action of the data signal of the data line.

Embodiment II

Further, another embodiment is provided by the present disclosure, wherein the control switches are divided into two sets: the control switches corresponding to the pixel units related to those odd-numbered scan lines are configured as one set, referred to as "odd set", while the control switches corresponding to the pixel units related to those even-numbered scan lines are configured as the other set, which is referred to as "even set". The control terminals of the control switches of the odd set are connected in parallel to a first switch-control line to receive a first switch-control signal, and thus are turned on or off under the action of this signal. Moreover, the control terminals of the control switches of the even set are connected in parallel to a second switch-control line to receive a second switch-control signal, and thereby are turned on or off under the action of this signal.

In particular, in the scanning direction, the control terminals of the control switches TFT_1, TFT_3, TFT_5 . . . of the pixel units to which the odd-numbered scan lines Gate_1, Gate_3, Gate_5 . . . are connected may be connected in parallel to a first switch-control line Line_1 to receive the first switch-control signal SW1, and thus are turned on or off under the action of this signal. Meanwhile, the control terminals of the control switches TFT_2, TFT_4, TFT_6 . . . of the pixel units to which the even-numbered scan lines Gate_2, Gate_4, Gate_6 . . . are respectively connected may be connected in parallel to a second switch-control line Line_2 to receive the second switch-control signal SW2, and then are turned on or off under the action of this signal.

Figure 3A:
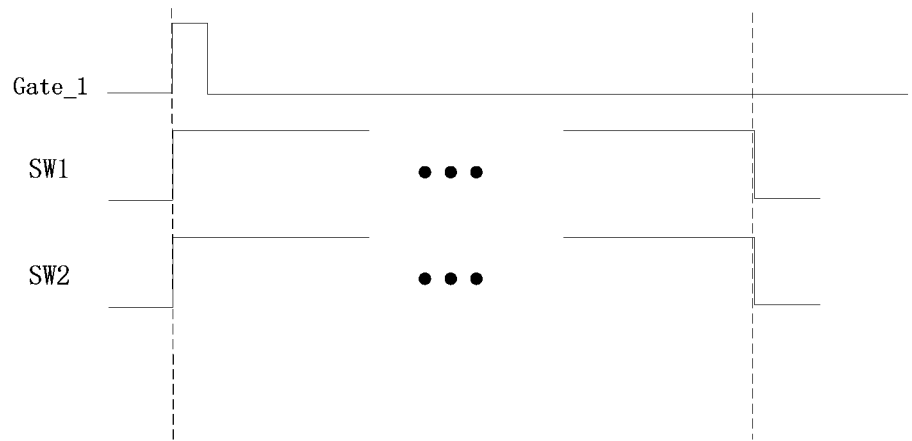
FIG. 3A is a diagram of a timing control signal under a two-dimensional scanning mode according to a second embodiment of the present disclosure.

As FIG. 3A shows, this embodiment and Embodiment I have the following feature in common. In the two-dimensional scanning mode, both the first switch-control signal SW1 and the second switch-control signal SW2 are continuous, high-level signals, and thereby all of the control switches can be kept on during the scanning period. That is, the aforementioned operating condition that "each control switch is turned on when at least there is a scan signal on the scan line to which the control switch is connected" is fulfilled.

Unlike Embodiment I, under the three-dimensional scanning mode of this embodiment, the first switch-control signal SW1 and the second switch-control signal SW2 are signals of pulse sequence which are synchronized with one another but with inverse phases, and a pulse width of each pulse sequence signal is equal to the time length of the scan signal. Further, if N is an odd number, then the first switch-control signal SW1 is a pulse train in terms of even sequence, and the second switch-control signal SW2 is a pulse train in terms of odd sequence; if N is an even number, the first switch-control signal SW1 is a pulse train in terms of odd sequence, while the second switch-control signal SW2 is a pulse train in terms of even sequence.

Figure 3B:
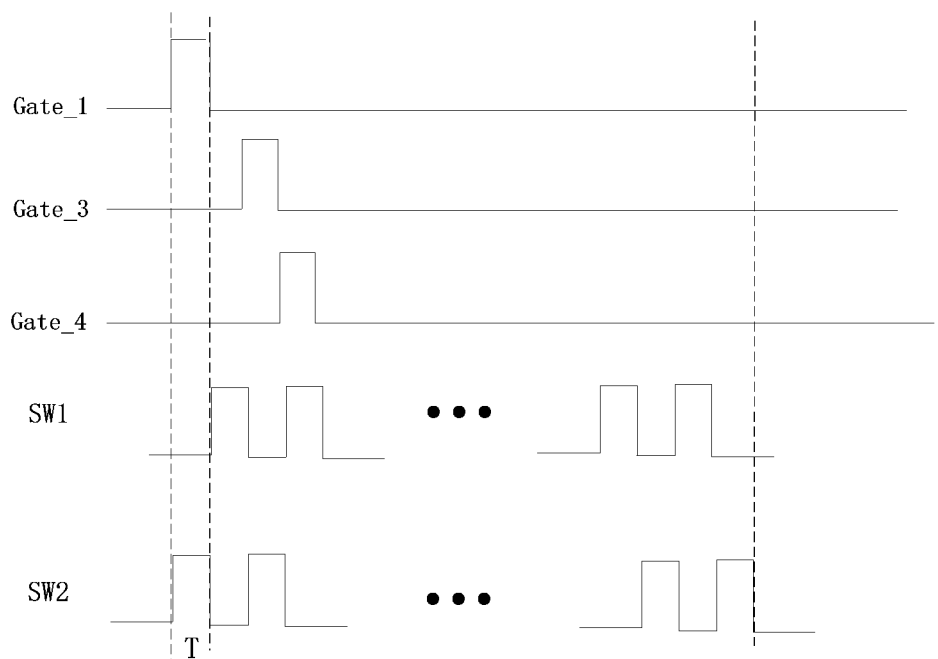
FIG. 3B is a diagram of a timing control signal under a three-dimensional scanning mode according to the second embodiment of the present disclosure embodiment when N is an odd number.

An example is taken when N=3. As FIG. 3B shows, the first switch-control signal SW1 is a pulse train in terms of even sequence, and the second switch-control signal SW2 is a pulse train in terms of odd sequence. In the scanning direction, when a high-level scan signal is input to the third scan line Gate_3, the first control signal SW1 received at the control terminal of the control switch TFT_1 to which the third scan line Gate_3 is connected is shown at a low level, such that the control switch TFT_1 is turned off. When a high-level scan signal is input to the fourth scan line Gate_4, the second control signal SW2 received at the control terminal of the control switch TFT_2 to which the fourth scan line Gate_4 is connected is at a low level, such that the control switch TFT_2 is turn-off . . . and so forth. Based on such a timing control manner, when the scan signal is input to a scan line, the control switch to which this scan line is connected may be turned off due to the low-level control signal (SW1 or SW2) received at the control terminal of the switch, such that the aforementioned operating condition that "each control switch is turned off when at least there is a scan signal on the scan line to which the control switch is connected" is fulfilled.

Figures 3C, 4:
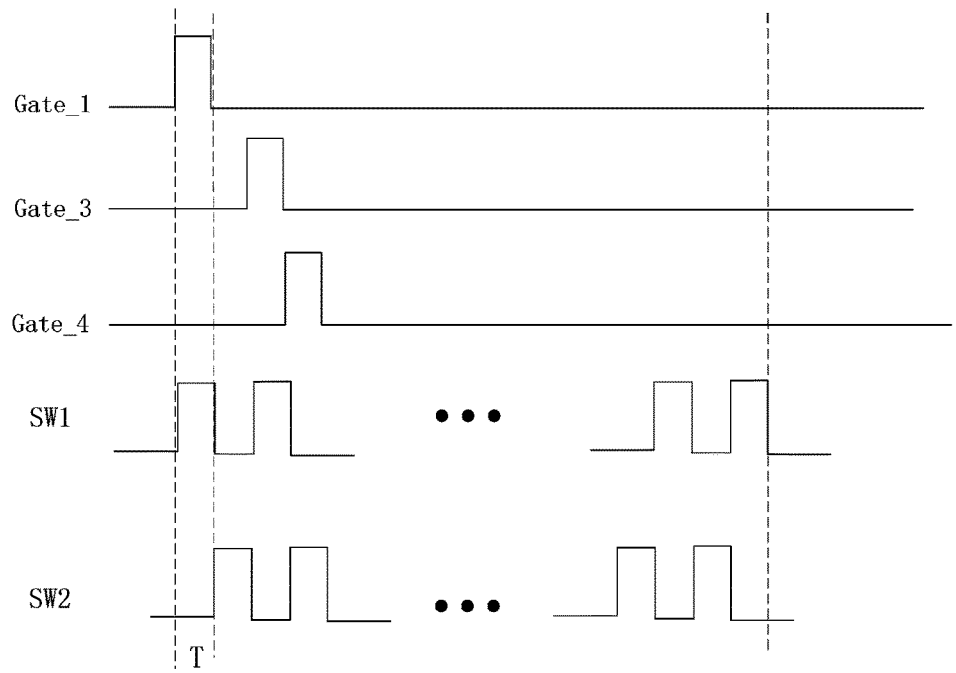
FIG. 3C is a diagram of the timing control signal under the three-dimensional scanning mode according to the second embodiment of the present disclosure embodiment when N is an even number.
FIG. 4 is Table I and shows changes of a voltage exerted on the pixel electrode and its voltage difference from the common electrode.

In an example when N=4, as shown in FIG. 3C, the first switch-control signal SW1 is a pulse train in terms of odd sequence, and the second switch-control signal SW2 is a pulse train in terms of even sequence. In the scanning direction, when a high-level scan signal is input to the fourth scan line Gate_4, the first control signal SW1 received at the control terminal of the control switch TFT_1 to which the fourth scan line Gate_4 is connected is shown at a low level, such that the control switch TFT_1 is turned off. When a high-level scan signal is input to the fifth scan line Gate_5, the second control signal SW2 received at the control terminal of the control switch TFT_2 to which the fifth scan line Gate_5 is connected is at a low level, such that the control switch TFT_2 is turned off . . . and so forth. Based on such a timing control manner, when the scan signal is input to a scan line, the control switch to which this scan line is connected may be turned off due to the low-level control signal (SW1 or SW2) received at the control terminal of the switch. That is, the aforementioned operating condition that "each control switch is turned off when at least there is a scan signal on the scan line to which the control switch is connected" is fulfilled.

Although embodiments are presented as above, the foregoing content is merely used for explanation of the disclosure but not to limit the present disclosure. Any modifications and variations in the implementing manner and details can be made by a person skilled in the art within the spirit and scope of the present disclosure. Therefore, the scope of the present disclosure should be subjected to the scope defined by the patent claims.

The invention claimed is:

1. An array substrate, comprising:
a plurality of scan lines and a plurality of data lines; and
a plurality of pixel units arranged in an array formed by the plurality of scan lines and the plurality of data lines in a staggered manner, wherein each of the pixel units correlates with one of the scan lines and one of the data lines, and comprises:
a main-area electrode connected to a related data line via a main-area control switch, a control terminal of which switch is connected to a related scan line, such that the main-area electrode has, when there is a scan signal on the scan line, a main-area voltage by receiving a data signal from the data line;
a sub-area electrode connected to a related data line via a sub-area control switch, a control terminal of which switch is connected to a related scan line, such that the sub-area electrode has, when there is the scan signal on the scan line, a sub-area voltage by receiving the data signal from the data line; and
a sharing capacitor connected to the sub-area electrode via a sharing control switch, wherein a control terminal of the sharing control switch is connected, via a control switch, to a scan line correlated with an $N^{th}$ pixel unit which is arranged in a scanning direction and counted from the present pixel unit,
wherein said control switch is configured, according to a received control signal, to be turned on under a two-dimensional scanning mode when at least there is the scan signal on the scan line to which the control switch is connected, and to be turned off under a three-dimensional scanning mode when at least the scan signal is on the scan line to which the control switch is connected,
wherein, in the scanning direction, the control switches correlated with the pixel units in terms of every N−1 scan lines are configured as one set, wherein the control terminals of odd-numbered sets of control switches are connected to a first switch-control line to receive a first switch-control signal, under the action of which the control switches are turned on or turned off, and the control terminals of even-numbered sets of control switches are connected to a second switch-control line to receive a second switch-control signal, under the action of which the control switches are turned on or turned off, and wherein
under the two-dimensional scanning mode, both the first switch-control signal and the second switch-control signal are continuous, high-level signals, and
under the three-dimensional scanning mode, the first switch-control signal and the second switch-control signal are signals which are synchronized with one another, i.e., a pulse train in terms of odd sequence and a pulse train in terms of even sequence respectively, a pulse width of which is equal to (N−1) times the duration of the scan signal.

2. The array substrate according to claim 1, wherein,
the control terminals of the control switches correlated with the pixel units to which the odd-numbered scan lines are related are connected in parallel to a first switch-control line to receive a first switch-control signal, under the action of which the control switches are thus turned on or turned off, and the control terminals of the control switches correlated with the pixel units to which the even-numbered scan lines are related are connected in parallel to a second switch-control line to receive a second switch-control signal, under the action of which the control switches are thus turned on or off, wherein
under the two-dimensional scanning mode, both the first switch-control signal and the second switch-control signal are continuous, high-level signals; and
under the three-dimensional scanning mode, the first switch-control signal and the second switch-control signal are signals of pulse sequence which are synchronized with one another but with inverse phases, a pulse width of which is equal to the time length of the scan signal, and meanwhile
if N is an odd number, then the first switch-control signal is a pulse train in terms of even sequence, and if N is an even number, the first switch-control signal is a pulse train in terms of odd sequence.

3. The array substrate according to claim 1, wherein,
the array substrate is further provided with auxiliary lines with each matching one of the scan lines, by means of one of the auxiliary lines the control terminal of the sharing control switch in each of the pixel units being connected to its related control switch.

4. The array substrate according to claim 2, wherein,
the array substrate is further provided with auxiliary lines with each matching one of the scan lines, by means of one of the auxiliary lines the control terminal of the sharing control switch in each of the pixel units being connected to its related control switch.

5. The array substrate according to claim 3, wherein, the control switch is arranged at a fan-out area.

6. The array substrate according to claim 4, wherein, the control switch is arranged at a fan-out area.

7. The array substrate according to claim 1, wherein, the main-area control switch, the sub-area control switch, the sharing control switch and the control switch each are thin film transistors.

8. The array substrate according to claim 2, wherein, the main-area control switch, the sub-area control switch, the sharing control switch and the control switch each are thin film transistors.

9. A liquid crystal display panel including an array substrate, the array substrate comprising:
a plurality of scan lines and a plurality of data lines; and
a plurality of pixel units arranged in an array formed by the plurality of scan lines and the plurality of data lines in a staggered manner, wherein each of the pixel units correlates with one of the scan lines and one of the data lines, and comprises:
a main-area electrode connected to a related data line via a main-area control switch, a control terminal of which switch is connected to a related scan line, such that the main-area electrode has, when there is a scan signal on the scan line, a main-area voltage by receiving a data signal from the data line;
a sub-area electrode connected to a related data line via a sub-area control switch, a control terminal of which switch is connected to a related scan line, such that the sub-area electrode has, when there is the scan signal on the scan line, a sub-area voltage by receiving the data signal from the data line; and
a sharing capacitor connected to the sub-area electrode via a sharing control switch, wherein a control terminal of the sharing control switch is connected, via a control switch, to a scan line correlated with an $N^{th}$ pixel unit which is arranged in a scanning direction and counted from the present pixel unit,
wherein said control switch is configured, according to a received control signal, to be turned on under a two-dimensional scanning mode when at least there is the scan signal on the scan line to which the control switch is connected, and to be turned off under a three-dimensional scanning mode when at least the scan signal is on the scan line to which the control switch is connected,
wherein, in the scanning direction, the control switches correlated with the pixel units in terms of every N−1 scan lines are configured as one set, wherein the control terminals of odd-numbered sets of control switches are connected to a first switch-control line to receive a first switch-control signal, under the action of which the control switches are turned on or turned off, and the control terminals of even-numbered sets of control switches are connected to a second switch-control line to receive a second switch-control signal, under the action of which the control switches are turned on or turned off, and wherein
under the two-dimensional scanning mode, both the first switch-control signal and the second switch-control signal are continuous, high-level signals, and
under the three-dimensional scanning mode, the first switch-control signal and the second switch-control signal are signals which are synchronized with one another, i.e., a pulse train in terms of odd sequence and a pulse train in terms of even sequence respectively, a pulse width of which is equal to (N−1) times the duration of the scan signal.

10. The liquid crystal display panel according to claim 9, wherein,
the control terminals of the control switches correlated with the pixel units to which the odd-numbered scan lines are related are connected in parallel to a first switch-control line to receive a first switch-control signal, under the action of which the control switches are thus turned on or turned off, and the control terminals of the control switches correlated with the pixel units to which the even-numbered scan lines are related are connected in parallel to a second switch-control line to receive a second switch-control signal, under the action of which the control switches are thus turned on or off, wherein
under the two-dimensional scanning mode, both the first switch-control signal and the second switch-control signal are continuous, high-level signals; and
under the three-dimensional scanning mode, the first switch-control signal and the second switch-control signal are signals of pulse sequence which are synchronized with one another but with inverse phases, a pulse width of which is equal to the time length of the scan signal, and meanwhile
if N is an odd number, then the first switch-control signal is a pulse train in terms of even sequence, and if N is an even, the first switch-control signal is a pulse train in terms of odd sequence.

11. The liquid crystal display panel according to claim 9, wherein,
the array substrate is further provided with auxiliary lines with each matching one of the scan lines, by means of one of the auxiliary lines the control terminal of the sharing control switch in each of the pixel units being connected to its related control switch.

12. The liquid crystal display panel according to claim 10, wherein,
the array substrate is further provided with auxiliary lines with each matching one of the scan lines, by means of one of the auxiliary lines the control terminal of the sharing control switch in each of the pixel units being connected to its related control switch.

13. The liquid crystal display panel according to claim 9, wherein,
the control switch is arranged at a fan-out area.

14. The liquid crystal display panel according to claim 10, wherein,
the control switch is arranged at a fan-out area.

15. A method for driving a liquid crystal display panel, including steps for driving two-dimensional scanning and steps for driving three-dimensional scanning, wherein
the steps for driving the two-dimensional scanning comprise:
sequentially inputting, in a scanning direction, a scan signal to each scan line;
turning on, when the scan line has a scan signal, a main-area control switch and a sub-area control switch in a pixel unit to which the scan line is related, so that a main-area electrode and a sub-area electrode have an identical voltage under the action of a data signal on a data line; and turning on, at the same time, a control switch connected to the scan line, so as to turn on a sharing control switch connected to the control switch, so that a charge-sharing effect is enabled in the pixel unit to which the sharing control switch is located; and the steps for driving the three-dimensional scanning comprise:
sequentially inputting, in a scanning direction, a scan signal to each scan line;
turning on, when the scan line has a scan signal, the main-area control switch and the sub-area control switch in the pixel unit to which the scan line is related, so that the main-area electrode and the sub-area electrode have an identical voltage under the action of a data signal on a data line; and turning off, at the same time, the control switch connected to the scan line,
wherein, in the scanning direction, the control switches correlated with the pixel units in terms of every N−1 scan lines are configured as one set, and the control switches of odd-numbered sets are applied with a first switch-control signal and the control switches of even-numbered sets are applied with a second switch-control signal, and wherein
under the two-dimensional scanning mode, both the first switch-control signal and the second switch-control signal are continuous, high-level signals, and
under the three-dimensional scanning mode, the first switch-control signal and the second switch-control signal are signals which are synchronized with one another, i.e., a pulse train in terms of odd sequence and a pulse train in terms of even sequence respectively, a pulse width of which is equal to (N−1) times the time length of the scan signal.

16. The method according to claim 15, wherein,
the control terminals of the control switches correlated with the pixel units to which the odd-numbered scan lines are related are applied with the a first switch-control signal, and the control terminals of the control switches correlated with the pixel units to which the even-numbered scan lines are related are applied with a second switch-control signal, wherein
under the two-dimensional scanning mode, both the first switch-control signal and the second switch-control signal are continuous, high-level signals; and
under the three-dimensional scanning mode, the first switch-control signal and the second switch-control signal are signals of pulse sequence which are synchronized with one another but with inverse phases, a pulse width of which is equal to the time length of the scan signal, and meanwhile,
if N is an odd/even number, then the first switch-control signal is a pulse train in terms of even/odd sequence.

* * * * *